Nov. 1, 1927. 1,647,562
J. DREW
MILK STRAINER
Filed July 23, 1925
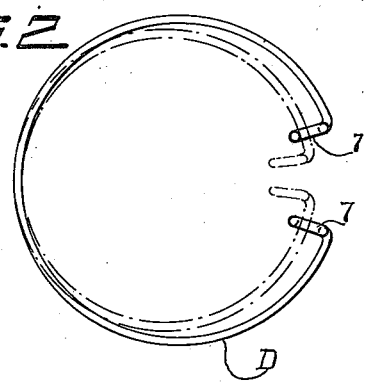
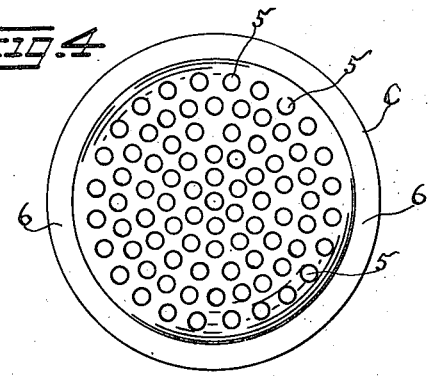
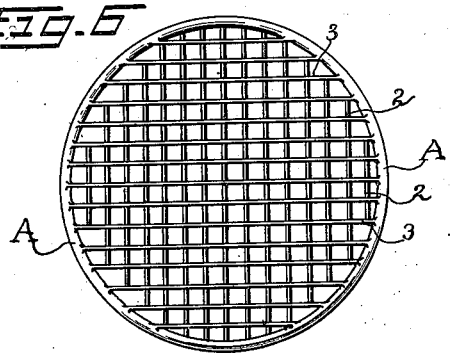
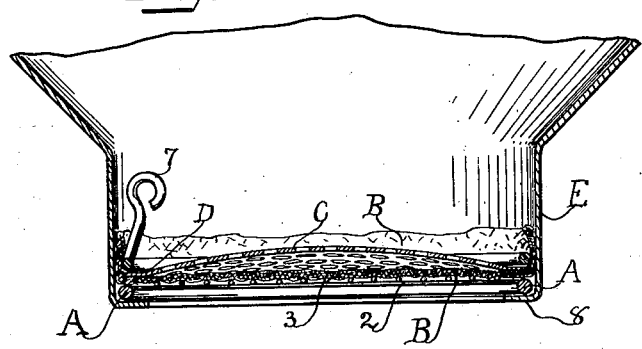
INVENTOR.
John Drew
BY F. N. Gilbert
ATTORNEYS.

Patented Nov. 1, 1927.

1,647,562

UNITED STATES PATENT OFFICE.

JOHN DREW, OF BINGHAMTON, NEW YORK.

MILK STRAINER.

Application filed July 23, 1925. Serial No. 45,456.

My invention relates to improvements in milk strainers, and has for its object to provide a strainer which will secure the sanitary and rapid straining of milk, also for filtering milk and detecting the particles of dirt therein, a feature of my device is a method of filtering the milk so as to enable the milk to pass into the can or other receptacle free from dirt, and without straining through an objectionable mass of dirt. Another object is to have a structure, in which the strainer is separable from the base of the strainer bowl, and fits the strainer bowl so as to admit of introducing a suitable straining fabric or substance. A further object is to provide a device of this character in which the various parts are separable so as to facilitate the cleaning thereof, and permit the introduction of a plurality of straining and filtering devices or fabrics, and easy removal of the same, and in different forms for more completely accomplishing the work. With these and other objects in view, my invention consists in certain novel features of construction and arrangement of parts as will be hereinafter more fully described and pointed out in the claim, reference being had to the accompanying drawings in which:

Fig. 1 is an edge view of a detailed part of my invention.

Fig. 2 is a plan view of the same part.

Fig. 3 is an edge view of another detailed part of my invention.

Fig. 4 is a plan view of the same part.

Fig. 5 is an edge view of another detailed part of my invention.

Fig. 6 is a plan view of the same part.

Fig. 7 is a side elevation in cross section of my device as mounted in a straining bowl.

The same reference characters denote like parts in each of the several figures of the drawings.

In carrying out my invention, I have an arrangement of superposed parts. I have a metallic ring A on the upper surface of which I have two superposed layers of spaced apart wires 2 and 3, the wires of each layer at right angles to the wires of the other layer, forming a rectangular mesh; over which mesh I place a layer of straining fabric B, such as a piece of cotton wadding substance, the piece being cut in circular form to conform to the outline of the ring and mesh support A. Over the layer of fabric of cotton mentioned, I removably place a disk C, having a perforated convex surface 4, the perforations being circular openings 5, 5 and the disk surface projecting into a horizontal edge 6 surrounding it. The horizontal edge surface 6 forms a pressure contact with the fabric B mentioned and tends to hold it taut. Mounted over the edge or upon the edge of the disk, I have a bifurcated or split spring ring or clamp D, the ends of which at the bifurcation extend vertically upward forming thumb projections 7, 7 for compressing the ring in mounting my device in position, and for removal of the same from its clamping position in the neck of the strainer bowl E. In the operation of my device I usually have the device mounted in a strainer bowl in common use of the form designated by E. It is intended to mount the superposed parts in the order named in the neck of the bowl, the lower ring mesh A resting on the inwardly projecting flange 8 of the neck of bowl E.

In the operation of my device I first insert the ring mesh A, having on its upper surface the rectangular mesh layers 2 and 3, by resting the ring A on the inwardly projecting flange 8 of the strainer bowl E. I next place upon the wire mesh surfaces 2 and 3 the cotton batting fabric B mentioned for filtering and straining. I next place upon the fabric the convex disk 6, with its horizontal edge 6 pressing upon and stretching out the fabric B. Over the perforated disk C I mount the spring ring clamp D, compressing it by drawing the thumb projections 7, 7 together until it rests on the edge 6 of the disk C, within the bowl neck E; and on releasing the projections 7, 7 the ring expanding against the interior of the neck E is there held firmly, and holds the superposed parts mentioned firmly within the neck E ready for straining and filtering the milk or other liquid. One of the advantages of my device is that in straining liquids, every part of my strainer device is quickly accessible for the purpose of cleansing and the parts being separable, a plurality of filtering material or fabrics are permitted and may be used. A complete distribution of the milk through the perforations 5, 5 is permitted and spread out by the convex formation of disk C. In the use of my strainer in a dairy for filtering and cleansing the milk preparatory to its being shipped in cans, the milk when brought from the cows is poured into the strainer bowl, upon the convex disk C, and is spread to quickly pass through the openings 5, 5 and on to the surface of the taut fabric B and the full width and extent of the filtering surface is utilized and supported on the rectangular openings in the mesh A. It results in a rapid and thorough straining and filtering of the milk through the cotton batting fabric positioned as above described.

Having thus described my invention, what I claim as new and for which I desire Letters Patent is as follows:

A strainer comprising in combination with a receptacle having a cylindrical portion provided with an inwardly extending annular flange, of a flat reticulated member supported on the annular flange, a sheet of fibrous filtering material disposed upon the reticulated member and having its edge extending upwardly and engaging the walls of the cylindrical portion, a perforated toric member provided with a flat annular margin resting on the filtering material, and an expansible split ring disposed upon the flat annular margin of the perforated toric member and engaging the upwardly extending edge of the sheet of filtering material for securing said members and material in position, said split ring having its ends turned upwardly and inwardly to provide handles for manipulating the split ring.

In testimony whereof I have affixed my signature.

JOHN DREW.